United States Patent
Ronchi

(10) Patent No.: US 12,162,639 B2
(45) Date of Patent: Dec. 10, 2024

(54) MODULAR APPARATUS FOR FILLING AND CLOSING ARTICLES WITH OPPOSITELY ARRANGED TRANSPORT PLANES

(71) Applicant: RONCHI MARIO S.P.A., Milan (IT)

(72) Inventor: Cesare Ronchi, Milan (IT)

(73) Assignee: RONCHI MARIO S.P.A., Milan (IT)

( * ) Notice: Subject to any disclaimer, the term of this patent is extended or adjusted under 35 U.S.C. 154(b) by 0 days.

(21) Appl. No.: 17/755,508

(22) PCT Filed: Oct. 29, 2020

(86) PCT No.: PCT/IB2020/060130
§ 371 (c)(1),
(2) Date: Apr. 29, 2022

(87) PCT Pub. No.: WO2021/084453
PCT Pub. Date: May 6, 2021

(65) Prior Publication Data
US 2024/0166390 A1    May 23, 2024

(30) Foreign Application Priority Data

Oct. 30, 2019  (IT) .................. 102019000020034
Oct. 30, 2019  (IT) .................. 102019000020046
(Continued)

(51) Int. Cl.
*B65B 43/46*  (2006.01)
*B25J 9/00*  (2006.01)
(Continued)

(52) U.S. Cl.
CPC ............ *B65B 43/46* (2013.01); *B25J 9/00* (2013.01); *B25J 9/0084* (2013.01); *B25J 9/0093* (2013.01);
(Continued)

(58) Field of Classification Search
CPC .. B65B 43/46; B65B 1/04; B65B 3/04; B65B 7/28; B25J 9/00; B25J 9/0093
(Continued)

(56) References Cited

U.S. PATENT DOCUMENTS 5,040,056 A * 8/1991 Sager ............... B25J 9/0093
901/8
5,095,681 A * 3/1992 Choi ................. B67B 3/22
53/367
(Continued)

FOREIGN PATENT DOCUMENTS

EP  2280873 B1  10/2012
WO  2009130112 A1  10/2009
(Continued)

OTHER PUBLICATIONS

ISA European Patent Office, International Search Report Issued in Application No. PCT/IB2020/060130, Feb. 12, 2021, WIPO, 4 pages.
(Continued)

*Primary Examiner* — Dariush Seif
(74) *Attorney, Agent, or Firm* — McCoy Russell LLP

(57) ABSTRACT

Modular apparatus for filling and closing randomly fed-containers including: a transport system for transporting the containers on a first transport plane along a respective article transport direction; a transport system transporting closing elements on a transport plane in a respective transport direction; a filling station; a closing station; an extraction system for transporting the filled and closed containers; first pick and place devices for picking up and positioning the containers; second pick and place devices for picking up and positioning said closing elements; a detection system which detects the position and the arrangement of the containers and the closing elements; a processing and control unit.

(Continued)

The extraction system includes a plane, which is oriented parallel to the longitudinal direction for extraction of the containers and a transverse widthwise direction of the apparatus and on which the filled and closed articles are transported arranged with a predefined orientation and/or position.

26 Claims, 5 Drawing Sheets

(30) Foreign Application Priority Data

Oct. 30, 2019 (IT) .................. 102019000020074
Oct. 30, 2019 (IT) .................. 102019000020080

(51) Int. Cl.

| | |
|---|---|
| B25J 15/00 | (2006.01) |
| B25J 15/04 | (2006.01) |
| B65B 1/04 | (2006.01) |
| B65B 3/04 | (2006.01) |
| B65B 5/04 | (2006.01) |
| B65B 7/28 | (2006.01) |
| B65B 11/00 | (2006.01) |
| B65B 35/16 | (2006.01) |
| B65B 35/24 | (2006.01) |
| B65B 57/00 | (2006.01) |
| B65B 57/10 | (2006.01) |
| B65B 59/00 | (2006.01) |
| B65B 59/04 | (2006.01) |
| B65B 65/00 | (2006.01) |
| B67C 7/00 | (2006.01) |

(52) U.S. Cl.
CPC .......... *B25J 15/0033* (2013.01); *B25J 15/04* (2013.01); *B65B 1/04* (2013.01); *B65B 3/04* (2013.01); *B65B 5/04* (2013.01); *B65B 7/28* (2013.01); *B65B 7/2807* (2013.01); *B65B 35/16* (2013.01); *B65B 35/24* (2013.01); *B65B 57/00* (2013.01); *B65B 57/10* (2013.01); *B65B 59/003* (2019.05); *B65B 59/04* (2013.01); *B65B 65/003* (2013.01); *B67C 7/002* (2013.01); *B65B 11/00* (2013.01)

(58) Field of Classification Search
USPC .......................................................... 53/467
See application file for complete search history.

(56) References Cited

U.S. PATENT DOCUMENTS

| | | | | |
|---|---|---|---|---|
| 5,370,216 A * | 12/1994 | Tsuruyama | ............ | B65G 47/24 198/395 |
| 5,437,361 A * | 8/1995 | Ohmori | ............ | B67B 3/062 198/465.1 |
| 5,863,177 A * | 1/1999 | Carson | ............ | B65B 19/34 198/786 |
| 7,591,364 B2 * | 9/2009 | Monti | ............ | B65B 35/56 198/444 |
| 7,765,776 B1 * | 8/2010 | Leu | ............ | B67B 3/00 53/411 |
| 10,261,940 B2 * | 4/2019 | Procyshyn | ............ | G06F 1/1632 |
| 10,308,381 B2 * | 6/2019 | Guggisberg | ............ | B65B 7/28 |
| 10,407,250 B2 * | 9/2019 | Iwai | ............ | G06T 1/0014 |
| 10,589,973 B2 * | 3/2020 | Nicholson | ............ | B67B 3/20 |
| 10,792,706 B2 * | 10/2020 | Wagner | ............ | B65B 57/14 |
| 10,857,673 B2 * | 12/2020 | Atohira | ............ | B65G 47/905 |
| 10,906,188 B1 * | 2/2021 | Sun | ............ | B25J 15/0616 |
| 10,954,008 B2 * | 3/2021 | Bertolin | ............ | B65B 43/00 |
| 2003/0056466 A1 * | 3/2003 | Muneyasu | ............ | B65G 47/917 141/171 |
| 2007/0106422 A1 * | 5/2007 | Jennings | ............ | B25J 9/0084 222/129.1 |
| 2009/0151305 A1 * | 6/2009 | Cassoni | ............ | A61P 35/00 53/485 |
| 2009/0205929 A1 * | 8/2009 | DeGuglielmo | ............ | B65B 5/105 198/347.1 |
| 2011/0030320 A1 * | 2/2011 | Blumenstock | ............ | B65B 7/2821 53/485 |
| 2011/0067781 A1 * | 3/2011 | Osborne | ............ | B65B 55/00 141/37 |
| 2011/0162332 A1 * | 7/2011 | Hecktor | ............ | B67B 3/06 53/488 |
| 2012/0090268 A1 * | 4/2012 | Krauss | ............ | B65B 3/003 53/281 |
| 2013/0239527 A1 * | 9/2013 | Clarke | ............ | B65B 69/00 53/381.1 |
| 2015/0274436 A1 * | 10/2015 | Di Donna | ............ | B65B 57/04 414/751.1 |
| 2017/0113910 A1 * | 4/2017 | Becchi | ............ | B65B 43/46 |
| 2018/0075506 A1 * | 3/2018 | Burkhard | ............ | B65B 59/003 |
| 2019/0023503 A1 * | 1/2019 | Tanoue | ............ | B65G 59/063 |
| 2019/0270200 A1 * | 9/2019 | Sakai | ............ | B25J 9/163 |
| 2019/0307643 A1 * | 10/2019 | Tribble | ............ | B65C 3/26 |
| 2019/0315004 A1 * | 10/2019 | Bechini | ............ | B25J 21/005 |
| 2019/0375602 A1 * | 12/2019 | Katagiri | ............ | B65G 47/1492 |
| 2020/0108438 A1 * | 4/2020 | Eusterwiemann | ..... | B25J 11/007 |
| 2020/0130877 A1 * | 4/2020 | Concetti | ............ | B65B 39/10 |
| 2020/0290817 A1 * | 9/2020 | Ronchi | ............ | B25J 9/0093 |
| 2020/0353510 A1 * | 11/2020 | Chandler | ............ | G01G 13/026 |
| 2020/0376616 A1 * | 12/2020 | Ohta | ............ | B65B 39/12 |
| 2021/0009394 A1 * | 1/2021 | Vann, Jr. | ............ | B67B 3/20 |
| 2021/0139256 A1 * | 5/2021 | Fu | ............ | B65G 57/02 |
| 2021/0171231 A1 * | 6/2021 | Bumatai | ............ | B65B 3/12 |
| 2021/0221547 A1 * | 7/2021 | Zaniboni | ............ | A24F 40/42 |
| 2021/0354933 A1 * | 11/2021 | Riekenbrauck | ......... | B65B 5/105 |
| 2022/0241982 A1 * | 8/2022 | Oishi | ............ | G06T 7/50 |
| 2022/0315355 A1 * | 10/2022 | Sun | ............ | B25J 9/163 |
| 2022/0396382 A1 * | 12/2022 | Bolognesi | ............ | B65B 57/14 |
| 2023/0257142 A1 * | 8/2023 | Blanc | ............ | B65G 47/1492 53/396 |
| 2023/0303342 A1 * | 9/2023 | Kulkarni | ............ | B07C 5/36 |
| 2024/0092520 A1 * | 3/2024 | Ochs | ............ | B65B 5/024 |

FOREIGN PATENT DOCUMENTS

| | | |
|---|---|---|
| WO | 2014064592 A2 | 5/2014 |
| WO | 2019082113 A1 | 5/2019 |

OTHER PUBLICATIONS

ISA European Patent Office, Written Opinion of the International Searching Authority Issued in Application No. PCT/IB2020/060130, Feb. 12, 2021, WIPO, 6 pages.

* cited by examiner

MODULAR APPARATUS FOR FILLING AND CLOSING ARTICLES WITH OPPOSITELY ARRANGED TRANSPORT PLANES

CROSS REFERENCE TO RELATED APPLICATIONS

The present application is a U.S. National Phase of International Application No. PCT/IB2020/060130 entitled "MODULAR APPARATUS AND METHOD FOR FILLING AND CLOSING ARTICLES, PLANT WITH AT LEAST ONE MODULAR APPARATUS," and filed on Oct. 29, 2020. International Application No. PCT/IB2020/060130 claims priority to Italian Patent Application No. 102019000020034 filed on Oct. 30, 2019, Italian Patent Application No. 102019000020046 filed on Oct. 30, 2019, Italian Patent Application No. 102019000020074 filed on Oct. 30, 2019, and Italian Patent Application No. 102019000020080 filed on Oct. 30, 2019. The entire contents of each of the above-listed applications are hereby incorporated by reference for all purposes.

TECHNICAL FIELD

The present disclosure relates to a modular apparatus for filling and closing randomly fed articles, in particular containers, a method for filling and closing randomly fed articles and a plant for packaging articles such as containers, including one or more of said modular apparatus.

BACKGROUND AND SUMMARY

It is known that, in the technical sector relating to the packaging of products, for example in liquid, fluid, or powder form, there exists the need to handle articles, in particular containers, which have different capacities and forms and which are fed to automatic operating machines such as filling, capping, and labelling machines, each respectively designed to fill, close, label, or subsequently forward the articles/products for packaging.

It is also known that these automatic machines must generally be fed continuously, at regular intervals and/or at a predefined constant speed, namely in accordance with parameters determined by the requirements of the machines and by the production cycle for which they are designed and configured.

In addition, it may also be required that the containers should arrive at the automatic operating machines always in a certain—generally upright—position, i.e. with the filling opening directed upwards and/or with a specific orientation of their surfaces (conventionally identified as being front, side or rear relative to a longitudinal axis, the position of the filling mouth and/or the advancing direction through the machine), so as to allow correct handling of the article, for example necessary during the filling and labelling operations.

In this context, the packaging plants generally comprise a plurality of apparatus and machines comprising feeding apparatus—conventionally called sorting apparatus—which, starting with articles, such as containers arranged randomly in special hoppers—are able to sort and feed the containers in an ordered sequence and/or with a predefined orientation and/or position (e.g. erect position) to subsequent filling machines in which the containers are filled with the product and subsequently transported to capping apparatus for the application of a closing element, such as a cap, on each filled container. Downstream of the capping station there may be further machines, such as labelling machines, scales for checking the weight of the packaged product and/or automatic packaging machines.

The known packaging plants have hitherto been designed with the aim of maximizing the production capacity, the speed for sorting, filling, and capping the articles, and the efficiency of handling of said articles, with the aim of achieving maximum productivity during mass production.

For this purpose, the plants are generally custom-designed and built according to the capacity and production requirements of the client, with a series of apparatus and machines arranged in series and configured to process with the maximum efficiency and speed certain specific types of articles and to operate with a given predetermined production capacity.

One problem which has recently emerged is that resulting from the fact that the known packaging plants are not versatile with regard to the management of different production volumes or types of production.

In fact, if the demand for the type of article for which the plant is designed is less than that for which it has been configured, it is required to interrupt operation of the plants once production reaches the desired level.

Any changes in format of the articles to be handled and/or products to be dispensed require at least the intervention of specialized operators, washing of the apparatus and often also reconfiguration of the machine by the installation company.

In addition, if instead it is required to increase the production capacity of the installed plant, the only solution is to install a new plant in order to meet the excess demand which cannot be guaranteed by the packaging plant which has already been installed.

The same aforementioned drawbacks also have repercussions on the manufacturers of the packaging plants, in particular of the filling and capping lines, who are generally obliged to design and construct each plant based on the specific production requirements and type of articles specified by the clients; as a result, the production of the packaging plants and in particular the sorting, filling, and capping lines may be standardized only with regard to the more general aspects, but each plant must be subsequently designed and configured in each case with a huge investment in terms of time and technical and economic resources.

In the aforementioned context and in order to maximize the production capacity and the speed of packaging of the articles, the automation of the plants, in particular of the sorting apparatus, must be limited, since more complex and therefore highly automated apparatus work more slowly than simple apparatus which must not perform automatically complex operations or movements.

A further problem is that the known plants occupy a large space in particular lengthwise and, as mentioned, once installed, they cannot be easily removed or adapted to a reduction of or change in the production requirement.

The technical problem which is posed therefore is to provide an apparatus for filling and closing randomly fed articles, in particular containers, which solves or at least partially overcomes one or more of the said problems of the prior art.

A particular object of the present disclosure is to provide an apparatus for filling and closing articles, in particular containers, which is more versatile as regards variations in the volume and/or type of production required. This improved versatility may be desirable during design and construction of the apparatus and/or during production when the apparatus has been installed.

A further desirable aspect is that the apparatus should have small dimensions, be easy and low-cost from a production and assembly point of view, and that it should be able to be easily installed at any user location.

These results are obtained according to the present disclosure by a modular apparatus for filling and closing randomly fed articles, in particular containers, by means of closing elements which are also randomly fed, and by a method for filling and closing articles according to the herein disclosed subject matter.

The modular apparatus for filling and closing randomly fed articles, in particular containers, therefore comprises a system for transporting the articles arranged on at least a first transport plane along a respective articles transport direction; a system for transporting closing elements arranged randomly on at least a first transport plane for transporting closing elements, in a respective transport direction; a station for filling one of said articles, arranged in a filling position; a closing station for application of a respective one of said closing elements on a respective one of said filled articles A; an extraction system, designed to transport the filled and closed articles along a longitudinal extraction direction and in an extraction sense from upstream to downstream; one or more first pick and place devices for picking up and positioning the articles; one or more second pick and place devices for picking up and positioning said closing elements; a detection system for detecting the position and/or arrangement of the articles in transit on the at least first transport plane and the closing elements in transit on the respective at least first transport plane; a processing and control unit for the components and operating systems of the apparatus.

The extraction system may comprise an extraction plane for extraction of the filled and closed articles, which is oriented parallel to the longitudinal direction of extraction of the articles and to a transverse widthwise direction of the apparatus and on which the filled and closed articles are transported arranged with a predefined orientation and/or position. The first transport plane for the articles and first transport plane for the closing elements are arranged on opposite sides of the extraction system, in particular of the extraction plane for the filled and closed articles.

Such a configuration of modular apparatus allows the production of plants with different capacities for sorting, filling, and capping articles such as containers to be filled with a fluid, using always a same modular structure of the filling and capping apparatus, and simply combining a suitable number of such apparatus in series along the extraction direction in order to obtain the necessary production capacity. Likewise, it is possible to vary the capacity of a plant which includes an apparatus according to the disclosure which has previously been installed by simply adding (or removing) further filling and capping modules upstream or downstream thereof in the longitudinal direction.

Also in connection with plants which have already been installed, it is also possible, owing to the modular structure of the apparatus according to the disclosure, to vary the production capacity of the plant depending on the actual needs by operating only one or more of the filling and capping modules which are independent of each other; alternatively or in combination it is also possible to realize different types of production using the various filling and capping modules arranged along the same extraction line.

The present disclosure relates furthermore to a plant for packaging articles, with at least one modular apparatus of the present disclosure.

BRIEF DESCRIPTION OF THE FIGURES

Further details may be obtained from the following description of non-limiting examples of embodiment of the subject of the present disclosure provided with reference to the case where the articles to be sorted are containers, such as bottles containing a product, and to the attached drawings, in which.

DETAILED DESCRIPTION

Figure 1:
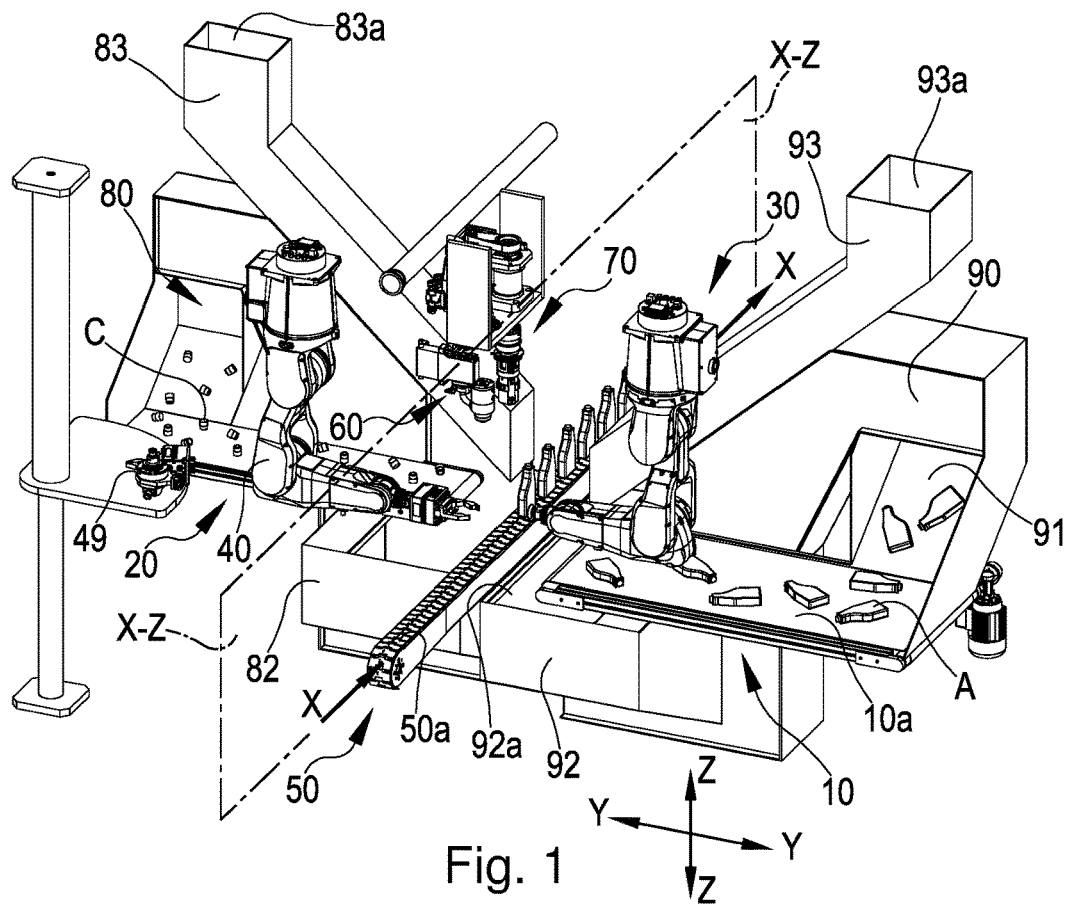
FIG. 1: shows a perspective view of a first example of embodiment of a modular apparatus for filling and capping articles according to the present disclosure.
Figure 2:
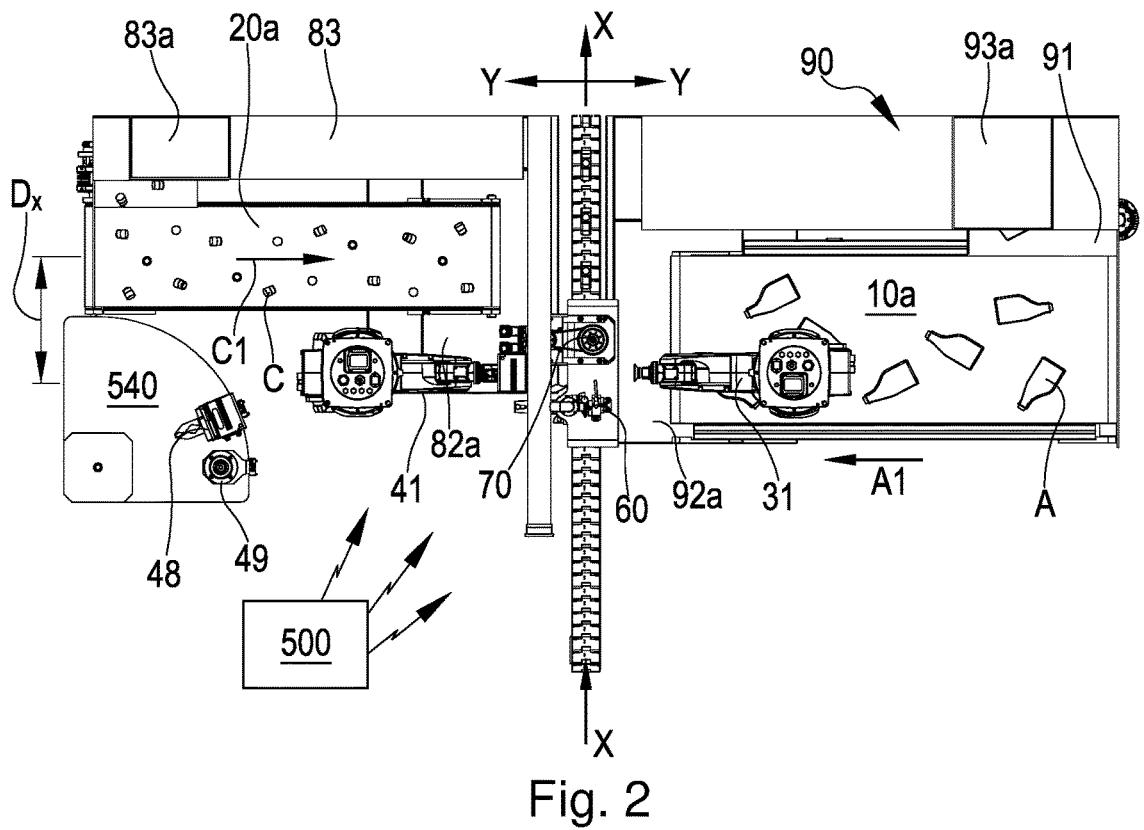
FIG. 2: shows a top plan view of the apparatus according to FIG. 1.

With reference to FIGS. 1 and 2 an apparatus according to the present disclosure for filling and capping articles A, in particular containers, randomly fed to the input of the said apparatus, comprises a transport system 10 for transporting the articles A designed to transport said articles arranged randomly on a first transport plane 10a along a respective direction of transport A1; and a system 20 for transporting closing elements for closing the articles A, in particular caps C, designed to transport in a respective transport direction C1 said closing elements arranged randomly on a respective transport plane 20a.

An extraction system 50 is designed to transport the filled and capped articles along a longitudinal extraction direction X-X (conventionally assumed for the sake of convenience as being a lengthwise dimension of the apparatus) and in an extraction sense conventionally assumed as being from upstream to downstream.

In particular, the extraction system 50 comprises an extraction plane 50a for the filled and closed articles which is oriented parallel to the longitudinal direction X-X of extraction of the articles and to a transverse widthwise direction Y-Y of the apparatus and on which the filled and closed articles are transported, being arranged with a predefined orientation and/or position. The extraction plane could also be only theoretical, for example in the case of extraction systems with movable grippers or cups which hold the filled articles and move them suspended along an extraction direction.

According to the disclosure, the first transport plane 10a for the articles A and the transport plane 20a for the closing elements C are arranged on opposite sides of the extraction system 50, in particular on opposite sides of the extraction plane for the filled and closed articles.

Figure 3:
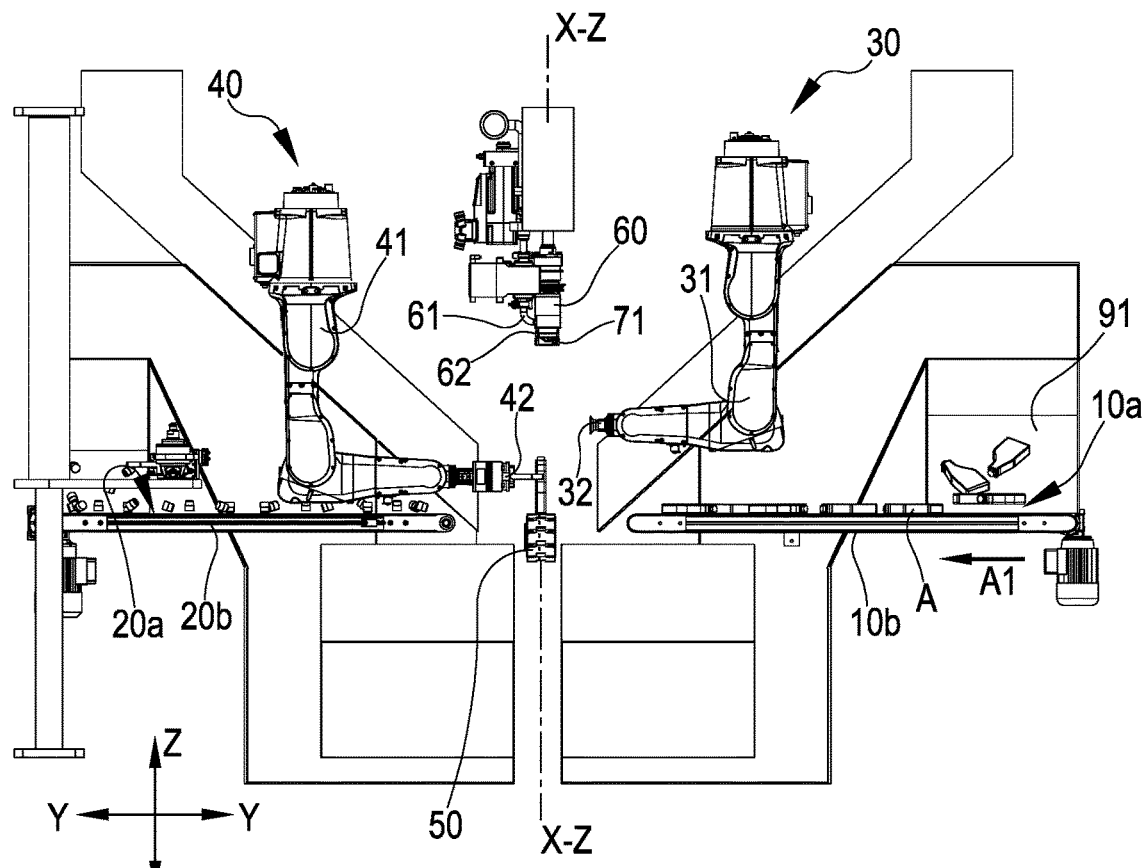
FIG. 3: shows a front view of the apparatus according to FIG. 1.

With reference to FIGS. 1-3, a vertical heightwise direction Z-Z of the apparatus is also defined, assumed solely for the sake of easier description and without a limiting meaning as being orthogonal to the said longitudinal extraction direction X-X and transverse widthwise direction Y-Y.

With reference still to FIGS. 1-3, the filling and capping apparatus according to the disclosure also comprises:

- a filling station 60 provided with means for filling the articles, in particular designed to feed and dispense a fluid or powder product into an open top mouth or opening of the container A in order to fill the same;
- a closing station 70 for closing the filled articles, provided with means 71 for applying a respective one of said closing elements C to the top mouth of one of said filled articles A;
- one or more first pick and place devices 30, arranged and configured to pick up articles A arranged randomly on the transport plane 10a and position them in a predefined filling orientation and/or position for filling at the filling station 60;
- one or more second pick and place devices 40, arranged and configured to pick up one of said closing elements from the said plane 20a of the respective transport system and feed it to the application means 71 of the closing station 70;
- a detection system designed to detect the position and the arrangement of the articles A in transit on the transport plane 10a and of the closing elements C in transit on the respective transport plane 20a and make the information available for controlling the pick and place devices 30,40.

The apparatus may also comprise a unit 500 for processing and controlling the components and the operating systems of the apparatus (only schematically shown in FIG. 2), for example configured to receive the detection signals made available by the detection system and consequently control the movement of the pick and place devices 30,40.

As can be seen in FIGS. 2 and 3, the plane 10a for transporting the articles A and the plane 20a for transporting the closing elements C are arranged on opposite sides of the extraction system, in particular on opposite sides, in the transverse direction, of a longitudinal-vertical plane X-Z (FIG. 3) parallel to the longitudinal extraction direction and to the vertical heightwise direction Z-Z and passing through the extraction plane 50a of the extraction system 50.

Owing to this configuration, the modular filling and closing apparatus according to the disclosure may be kept compact in the longitudinal direction and combined with a further similar filling and capping apparatus arranged upstream or downstream thereof in the longitudinal extraction direction, so as to construct a filling and capping plant of the modular type in which each apparatus according to the disclosure forms or comprises a module of a plurality of filling and capping modules arranged in series along the longitudinal extraction direction X-X and designed to deposit the filled and capped articles on a same extraction plane 50a.

"Modular" is understood as meaning that the apparatus forms as a whole a filling and closing unit which can be controlled independently, even if formed by a variety of devices and groups and/or even if the extraction system is shared with other modular apparatus.

In particular, each modular apparatus can be controlled so as to perform autonomously a cycle for filling and closing randomly fed articles by means of closing elements and/or is configured so that it can be added to/removed from a packaging plant substantially as a stand-alone unit and without substantially influencing the remaining structure of the plant.

It is therefore clear how such a configuration of modular apparatus allows the construction of plants with different capacities for sorting, filling, and capping articles such as containers to be filled with a fluid, using always a same modular structure of the filling and capping apparatus and by simply combining a suitable number of such apparatus in series along the extraction direction in order to obtain the necessary production capacity. Likewise, it is possible to vary the capacity of a plant which includes an apparatus according to the disclosure which has previously been installed by adding (or removing) further filling and capping modules upstream or downstream thereof in the longitudinal direction.

Also in connection with plants which have already been installed, it is also possible, owing to the modular structure of the apparatus according to the disclosure, to vary the production capacity depending on the actual needs by operating only one or more of the filling and capping modules which are independent of each other; alternatively or in combination it is also possible to perform different types of production using the various filling and capping modules arranged along the same extraction line.

Further aspects may be deduced from the following description, provided with continuous reference to FIGS. 1-3 and assuming a set of three reference axes in a longitudinal lengthwise direction X-X corresponding to the direction of extraction of filled and capped containers along the extraction plane, transverse widthwise direction Y-Y of the apparatus, orthogonal to said longitudinal direction, and vertical heightwise direction Z-Z of the apparatus orthogonal to the other two directions, as well as an upstream part and downstream part opposite to each other in the longitudinal extraction direction.

The transport system 10 for the containers may be of any type designed to transport articles arranged randomly on a transport plane. In the example shown in FIGS. 1-3, the system 10 for transporting the articles A comprises a conveyor belt 10b, the top surface of which defines the support and transport plane 10a through the apparatus for the containers A randomly fed by an assembly 90 for feeding the containers A.

The belt 10b moves along a first direction and sense A1 of movement which can be directed at an angle, such as between 80° and 100°, with respect to the longitudinal direction of extraction X-X and in a sense directed towards the plane 50a of the said extraction system. In particular, one aspect of the present disclosure is an arrangement of the transport system 10 such that the transport plane 10a and the direction A1 of advancing movement are oriented so as to be substantially orthogonal to the longitudinal extraction direction X-X and therefore parallel to the transverse direction Y-Y. This allows among other things the maximum longitudinal compactness and facilitates the arrangement of an article feeding assembly 90 and of the pick and place devices 30.

The article feeding assembly 90 is designed to randomly feed empty articles A towards the transport plane 10a. In the example shown, the assembly 90 comprises a chute 91, a bottom end of which is arranged so as to cause containers A to fall onto the transport plane 10a in the vicinity of an end thereof which is distal from the extraction plane in the direction and sense of advancing movement A1 and in any case upstream of the detection means of the detection system. The chute 91 is supplied by a storage vessel 92 to which the empty containers A are fed by means of a duct 93 with an inlet hopper 93a. In some embodiments, the storage receptacle 92 is arranged in a position situated below, in the vertical direction Z-Z, the container transport plane 10a and such that the containers A which are not picked up by the pick and release devices 30 fall into the storage receptacle 92 at the end of their travel movement along the transport plane 10a. In particular, the storage receptacle 92 may be arranged in a position situated below a terminal end of the plane 10a, between the plane 10a itself and the extraction system 50 and have an open mouth 92a for receiving the containers which fall at the end of their travel movement on the plane 10a.

This configuration facilitates recirculation of the containers not picked up by the pick and place devices 30, together with the further containers A fed to the apparatus. In the context of the modular apparatus according to the disclosure, a high degree of picking up and positioning efficiency by the pick and place devices 30 may in particular not be required, the versatility and automation of the said apparatus being more important; therefore, having an efficient system for recirculating the containers A such that the devices 30 may for example be configured to pick up only the containers A arranged on the plane with one or more predefined orientations, for example with a certain predefined visible flank. For example, a porter system (not shown) transports the containers A from the storage receptacle 92 to the chute 91, causing them to travel from a level below the transport plane 10a to a level above the same where they are released to the chute 91. In some embodiments, the porter system is configured to separate the containers A during transportation, for example by means of vibrating trays. The porter system may be used since it allows a very regular flow of articles to the chute 91; other transport systems are however feasible and are known in the sector.

The transport system 20 for the closing elements C may be of any type designed to transport products arranged randomly on a transport plane. In the example shown in FIGS. 1-3, the transport system 20 comprises a conveyor belt 20b, the top surface of which defines the support and transport plane 20a through the apparatus of the closing elements C, in particular caps for bottles, which are randomly fed by an assembly 80 for feeding closing elements, described further below.

The belt 20b moves along a respective direction and in a sense C1 of movement, which may be oriented at an angle, such as between 80° and 100°, with respect to the longitudinal extraction direction X-X and in a sense directed towards the plane 50a of the extraction system. In particular, an arrangement of the transport system 20 such that the transport plane 20a and the direction C1 of advancing movement are oriented so as to be substantially orthogonal to the longitudinal extraction direction X-X and therefore parallel to the transverse direction Y-Y. This allows maximum longitudinal compactness and facilitates the arrangement of the container feed assembly 80 and of the pick and place devices 40 for the closing elements.

According to a particular embodiment, the transport plane 10a for the containers A and the transport plane for the closing elements C are oriented at a same angle, in particular at right angles, with respect to the longitudinal direction X-X (measured on opposite sides of the extraction system) and may be axially offset in the same direction by a certain distance Dx (FIG. 2).

The assembly 80 for feeding closing elements is designed to feed randomly closing elements C to the transport plane 20a. In the example shown, the assembly 80 comprises a chute 81, a bottom end of which is arranged so as to cause closing elements C to fall onto the transport plane 20a in the proximity of an end thereof distal from the extraction plane 50a in the direction and sense of advancing movement C1 and in any case upstream of detection means of the detection system. The chute 81 is supplied by a storage receptacle 82, to which the empty closing elements C are fed by means of a duct 83 with an inlet hopper 83a. In some embodiments, the storage receptacle 82 is arranged in a position situated below, in the vertical direction Z-Z, the transport plane 20a for the closing elements and such that closing elements C not picked up by the pick and place devices 40 fall into the storage receptacle 82 at the end of their travel on the transport plane 20a. In particular, the storage receptacle 82 may be arranged in a position situated below a terminal end of the plane 20a, between the plane 20a itself and the extraction system 50, and have an open mouth 82a for receiving the closing elements which fall at the end of their travel on the plane 20a.

This configuration facilitates recirculation of the closing elements not picked up by the pick and place devices 40, together with the further closing elements C fed to the apparatus. In connection with the modular apparatus of the disclosure, a high pick-up and positioning efficiency of the devices 40 may not in particular be required, the versatility and automation of the said apparatus being more important. It is one aspect of the present disclosure to have an efficient system for recirculation of the closing elements C such that the pick and place devices 40 may be for example configured to pick up only closing elements C arranged on the plane 20a with one or more predefined orientations, for example with the closed top surface visible, or vice versa. In some embodiments, a porter system (not shown) transports the closing elements C from the storage receptacle 82 to the chute 81, causing them to travel from a level below the transport plane 20a to a level above the same, where they are released to the chute 81. For example, the porter system is configured to separate the closing elements C during transportation, for example by means of vibrating trays. Other transport systems are feasible and known in the sector.

The system 80 for feeding the articles and/or the system 90 for feeding the closing elements, in particular the chute 81,91 and/or the porter system and/or the duct 83;93 is/are arranged downstream in the longitudinal direction X-X of the respective first planes 10a,20a of the transport systems 10,20, as will become clear below.

A filling station 60 is configured to fill with a product, such as a fluid or for example a powder product, the inside of an article A arranged in a filling position in the station 60.

The filling station 60 may in particular be configured with means for feeding the product such as ducts 61, and means for dispensing the product inside the container A, for example a nozzle 62 which can be operated to open and close so as to dispense a predetermined quantity of product. The filling position is generally such that the article A to be filled is arranged in a position situated below, in the vertical direction Z-Z, the dispensing means 62.

According to a particular embodiment, the respective transport planes 10a,20a for the articles A to be filled and for the closing elements C are arranged on opposite sides, in the transverse direction Y-Y, at least of the dispensing means 62 of the filling station 60.

In particular, the dispensing means 62 and therefore the filling position may be located substantially above the extraction plane 50a and/or in a position such as to be intersected by said longitudinal-vertical plane X-Z. This facilitates and speeds up considerably the operations involving positioning of the articles and the caps by the pick and place devices 30,40 and also the positioning of the filled articles on the extraction plane 50a and at the same time allows the modular structure of the apparatus to be fully exploited.

A closing station 70 of a modular filling and capping apparatus according to the disclosure is configured to receive a closing element C, hold it until a filled article A arrives in a closing position in the closing station 70 and apply it to a top mouth or neck of the said article A in order to perform closing of the filled article.

For this purpose, the closing station 70 may include means 71 for holding and applying a closing element C, such as a cap for a container, in particular comprising chuck means designed to receive the closing element C and apply it, for example by means of rotation or pressure, onto the neck of a container. These holding and application means, as well as other similar devices, are known in the sector and are not described in detail and may vary depending on the type of closing element and container being processed.

The closing position is generally such that the article A to be filled is arranged in a position situated below, in the vertical direction Z-Z, the application means 71.

According to a particular embodiment, the feeding planes 10a,20a, respectively, of the articles A to be filled and of the closing elements C are arranged on opposite sides, in the transverse direction Y-Y, of the closing station 70, in particular at least of the holding and application means 71.

In particular, the holding and application means 71 and therefore the closing position may be located substantially above the extraction plane 50a and/or in a position such as to be intersected by said longitudinal-vertical plane X-Z. This facilitates and speeds up considerably the operations involving positioning of the articles and the caps by the pick and place devices 30,40 and also the positioning of the filled articles on the extraction plane 50a and at the same time allows the modular structure of the apparatus to be fully exploited.

The closing station 70 may be arranged downstream, in the longitudinal extraction direction X-X, of the filling station 60, but it is clear to the person skilled in the art that these position may also be reversed.

According to embodiments the filling and closing stations may be arranged adjacent, in particular substantially aligned, along the longitudinal extraction direction X-X.

The modular filling and closing apparatus according to the disclosure has gripping and positioning means which are configured to perform one or more, or all, of the following operations:
  holding an article A in a filling position in the filling station;
  displacing a filled article A from a filling station 60 into a closing position in a closing station 70;
  holding the article in the closing position during application of the closing element;
  displacing a filled and closed article A' from a closing position in the closing station into given extraction position and/or orientation on the extraction plane 50a.

According to a further embodiment, the gripping and positioning means may also be configured to discard an article, for example if the control unit 500 should detect an incorrect filling or capping operation, in particular depositing it on a static collection tray (not shown).

As will become clearer below, these gripping and positioning means may be mounted on the first and/or second pick and place devices. In particular, one or more of the second pick and place devices which are designed to pick up and feed a closing element C to the closing station 70 is/are configured to perform one or more of the operations described above. This allows the use of the second pick and place devices to be optimized, as will become clearer hereinafter.

The disclosure is however not limited in this sense, it being possible to provide further auxiliary devices which are able to implement one or more of the operations described above.

With reference still to FIGS. 1-3, the first pick and place devices may comprise at least one robotic arm 31, a free end of which carries gripping means 32 for picking up an article from the transport plane 10a. The second pick and place devices 40 may also comprise at least one robotic arm 41, a free end of which carries gripping means 42 for picking up a closing element from the transport plane 20a.

The at least one robotic arm 31;41 of the first and/or second pick and place devices may be of the anthropomorphic type, in particular with at least five, or at least six, axes of rotation and/or degrees of freedom. The modular apparatus according to the disclosure since it ensures a high degree of automation and versatility during the picking up, orientation and/or positioning of articles A and/or closing elements C with different forms, including asymmetrical forms. Indeed, an innovative aspect of the present disclosure is that what is sought after is not the maximum speed and efficiency during sorting of the articles, such that simple and therefore fast-action pick and place devices may be used, but instead the maximum versatility of each modular apparatus when managing different volumes and production types; therefore, the use of robotic arms of the type proposed allows greater versatility, even though the article processing speed may be penalized.

According to the embodiment shown (FIG. 3) the first pick and place devices 30 and the second pick and place devices 40 are arranged on opposite sides of the extraction system, in particular on opposite sides, in the transverse direction, of the longitudinal-vertical plane X-Z parallel to the longitudinal extraction direction and to the vertical heightwise direction Z-Z and passing orthogonally through the plane 50a of the extraction system 50. In particular said devices may be arranged at the respective transport plane 10a for the articles or transport plane 20a for the closing elements, where a respective area of action of the pick and place devices for picking up the respective articles A or closing elements C is defined.

In some embodiments, the first pick and place devices 30 and the second pick and place devices 40 are arranged on opposite sides, in the transverse direction Y-Y, of the filling station, in particular of the dispensing means 62, and/or of the closing station 70, in particular at least of the holding and application means 71.

In some embodiments, the first pick and place devices 30 are configured to pick up an article A from the plane 10a, re-orient it if necessary, position it with a certain orientation in the filling position in the filling station 60 and hold the article A in the filling position in the filling station for a predefined time interval, in particular until further gripping and positioning means have taken it up before, during or after dispensing of the product by the dispensing means 62 of the station 60.

In the embodiment shown, the gripping means 32 of the robotic arm 31 are of the sucker type, which are particularly effective for picking up containers A, including those with different forms.

In some embodiments, the second pick and place devices 40 are configured to pick up a closing element C (in particular a cap) from the transport plane 20a, re-orient it if necessary, and feed it with a certain orientation to the application means 71 of the closing station 70, from where the closing element is received and stably held until the article A to be capped arrives.

As already described, in a particular implementation, the second pick and place devices 40 are also configured to carry out one or more, or all, of the following operations:
hold an article A in a filling position in the filling station for at least part of the product dispensing step;
displace a filled article A from a filling station 60 into a closing position in a closing station 70;
hold the article in the closing position during application of the closing element;
displace a filled and closed article A' from a closing position in the closing station into a given extraction position and/or orientation on the extraction plane 50a;
discard the article should the control unit detect incorrect capping and/or filling.

In this way the need to provide specific means for holding and moving the containers into/between the filling and closing stations and from the latter to the extraction system is avoided, thus improving further the versatility of the modular apparatus.

Moreover, when it is the second pick and positioning devices 40 which perform one or more of the aforementioned operations, they free the first pick and place devices 30, allowing them to pick up and re-orient a following article, while a preceding article is being filled, thus optimizing the processing time and ensuring that, at the end of a filling operation, a following article to be filled is immediately ready. Furthermore, the fact that the application of the closing elements is generally a more rapid operation than the bottle filling operation and that capping takes place in any case after filling may be exploited.

Figure 4:
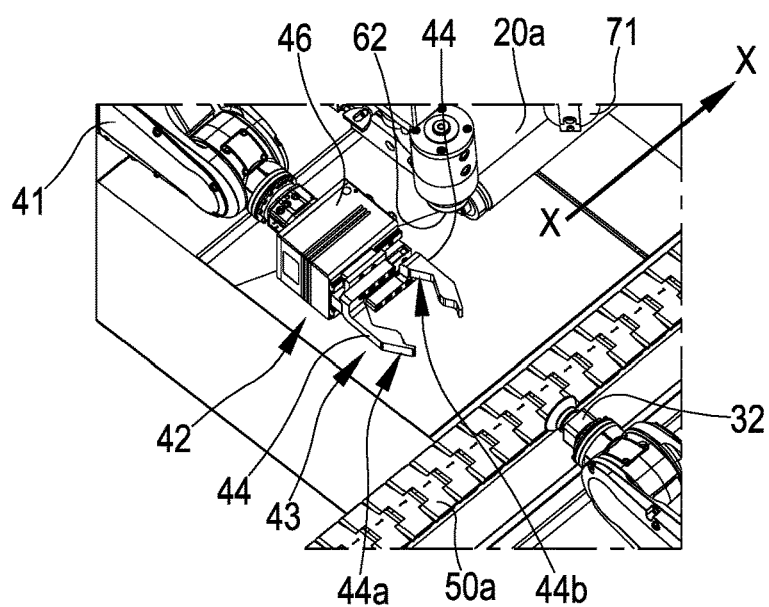
FIG. 4: shows a detailed view of the gripping means of the pick and place devices of the apparatus according to FIG. 1.

With reference to FIG. 4 a number of embodiments of a pick and place device 40 are now described.

As shown, a second device 40 may comprise gripping means 42 arranged at the free end of a robotic arm 41.

The gripping means 42 may comprise a gripper 43 composed of two claws 44 arranged opposite each other and movable towards and away from each other in order to open and close the gripper 43.

In some embodiments, each claw 44 defines a first jaw 44a configured to form with the opposite first jaw 44a means for gripping a closing element and a second jaw 44b configured to form, together with the opposite second jaw 44b, means for gripping an article A. The two jaws will generally have different dimensions and/or a different form. In particular, each jaw 44a,44b may be formed as a respective cavity directed towards the opposite jaw 44a,44b, for example with a substantially parallelepiped or frustoconical or truncated pyramid form with a respective open larger base, situated opposite the other jaw.

Opening and closing of the gripper 43 may be adjusted to different positions by means of operating means, for example electric actuators 46 which control the movement of the claws 44 towards and away from each other. In some embodiments, the operating means 46 are also able to adjust the closing force of the gripper 43. In this way a servo gripper 43 mounted on the second pick and place devices 40 is obtained, thus forming both the gripping means for picking up and feeding the closing elements to the closing station, and the gripping means which allow the pick and place devices to hold an article A in the filling position in the filling station and/or to displace a filled article A from a filling station 60 into a closing position in a closing station 70 and/or to keep the article in the closing position during application of the closing element, and/or to displace a filled and closed article from a closing position in the closing station into a given extraction position and/or orientation on the extraction plane 50a.

An extraction system 50 extends in the longitudinal extraction direction X-X and is designed to transport the filled and capped articles, arranged with a predefined orientation and/or position, on an extraction plane 50a which extends and moves along the said longitudinal direction X-X and in an extraction sense conventionally assumed to be from upstream to downstream.

In greater detail, the extraction plane 50a is able to receive the filled and closed articles A' and extract them from the apparatus along the extraction direction. The articles A' may be released by the gripping means which have been configured to move a filled and closed article from a closing position in the closing station 70 into a given extraction position and/or orientation on the extraction plane 50a, these gripping means being mounted on the second pick and place devices 40.

The extraction system may in particular comprise a conveyor belt 50b which is operated by an associated actuator and the top surface of which defines the extraction plane 50a. As shown, the conveyor belt 50b may be arranged in a substantially central position in the transverse widthwise extension direction Y-Y of the machine, with the transport systems 10,20 and the feeding systems 80,90 and/or the first and second pick and place devices 30,40 arranged on opposite sides, in the transverse direction, of the extraction belt 50b.

In some embodiments, the extraction plane 50a is not coplanar with the closing element transport plane 20a and/or the plane for transporting the articles A, this facilitating the movement trajectories of the robotic arms 31,41. This extraction plane may however be coplanar also with one or both the closing element transport plane(s) 20a and article transport plane(s) 10a.

The transport planes 10a, 20a and extraction plane 50a may also be parallel.

A particular embodiment of the sorting apparatus according to the disclosure is that in which the extraction system comprises a support plane 50a for the containers released by the pick and place devices 40 which is arranged substantially equidistant from the container transport plane 10a and from the closing element transport plane 20a. This allows the movements of the pick and release robots 31;41 which are associated with the respective first transport plane 10a,20a to be managed more simply. The apparatus according to the disclosure is, however, not strictly limited in this sense, it being possible to arrange the extraction system at a different distance from the first transport planes 10a,20a.

As regards the position for deposition of the filled and capped articles A' on the extraction plane 50a, according to a particular aspect of the present disclosure, said position is one of a plurality of predefined positions spaced from each other at a constant interval P along the extraction direction X-X.

According to this embodiment, the apparatus is configured so that a plurality of consecutive positions are defined on the extraction plane 50a, spaced from each other at a constant interval P, and the pick and place devices for holding and positioning filled and capped articles on the extraction place 50a are controlled to place the filled and capped article A' in one of said predefined position and, if required, with a predefined orientation.

In this context it is not necessary for all the successive predefined positions to be occupied by an article A' to be extracted, but only that the position for release to the extraction system should be one of the predefined positions.

This control operation may in particular be performed by the processing unit 500, as will emerge more clearly below.

This configuration facilitates coordination of extraction of the filled and closed articles A' by various modular apparatus arranged in series along the extraction direction on a same extraction plane 50a. Indeed, it will be sufficient for each modular apparatus to be controlled so as to deposit the articles A' to be extracted in one of the said predefined positions not occupied by an article A' filled and capped by a modular upstream apparatus. In particular, the processing and control units 500 of each modular apparatus (which may also be formed as a suitably configured processing unit) may perform the release of the filled and capped articles to the extraction belt 50b depending on a predefined arrangement for occupation of said predefined extraction positions (e.g. leaving free one position out of every two, three or more positions for the following modular apparatus situated downstream).

Moreover, the processing unit will have knowledge of the advancing position in the extraction direction X-X of all the filled and capped articles, thus being able to make said information available both for any downstream operating machines (for example labelling machines) and for following downstream modular filling and capping apparatus, which may in this way be controlled so as to deposit the associated filled articles in a predefined "empty" position not occupied by an article A' extracted by one of the upstream modular apparatus. A predefined rule for deposition of the articles A' to be extracted will therefore not be necessary.

In any case the extreme versatility of the modular apparatus according to the disclosure is evident, allowing for example a higher production volume to be obtained with a first upstream modular apparatus, which on average will occupy for example three positions out of every four successive extraction positions on the extraction plane 50a, while a following downstream modular apparatus will be able to realize the production of articles A' which require a greater filling time or for which a smaller production volume is required, occupying one position out of every four positions, which is left free on the extraction plane of the upstream apparatus.

If it is desired to increase the volume of the second production it is possible simply to control the first upstream apparatus so as to occupy only two positions out of every four positions on the extraction plane, freeing one more position for the downstream filling apparatus.

It will be clear to the person skilled in the art that this general concept may be adjusted and adapted to a variety of production types, configurations of apparatus and number of modules or modular filling and capping apparatus arranged in series.

An example of a detection system may comprise at least a first and second camera (or other suitable image acquisition device) each arranged so as to focus on a respective transport plane 10a;20a upstream in the direction of advancing movement A1,C1 of an action area, on the respective plane, of the respective first/second pick and place devices 30,40.

Each camera may be designed to record the position and arrangement of the containers A or closing elements C in transit on the respective transport plane within its viewing field, making the information available for controlling the operation of the respective pick and place devices 30,40. Cameras of this type are known in the sector of sorting machines and are not described in greater detail In some embodiments, the detection system also comprises means for backlighting one or both the transport planes 10a,20a, allowing the image acquired by a first or second camera to be improved.

The detection system may comprise also means 63 for measuring the advancing movement of the transport plane 10a;20a of one and/or the other transport system 10,20, for example comprising an encoder associated with means for moving the belt 10b;20b which form the plane 10a;20a.

The processing and control unit is in particular at least configured to receive the information from the detection system and to control consequently the pick and place devices. Moreover, it may control the positioning of the filled articles A' to be extracted and/or store information relating to their position on the extraction plane.

In the presence of several modular apparatus, the processing unit may be a single one for all the apparatus, it may incorporate a plurality of processing units each designed to control a respective apparatus, there may be provided a coordinating unit which manages and coordinates the single processing units of each modular apparatus, or a combination of such configurations. The realization of such a processing unit or coordinating unit on the basis of the teachings of the present description is within the competence of the person skilled in the art.

For the sake of easier description, a container A is described, defined as asymmetrical since it is characterized by an irregular form, such as that for example shown in FIGS. 1-3.

The container has a form with neck or mouth part—intended to receive a closing cap—which is positioned eccentrically with respect to the container body. Each container is provided with a filling opening which normally may have a circular form, with a main (or longitudinal) axis—generally aligned with the greater dimension of the container—which may be orthogonal to said filling opening, passing through the centre thereof, or axially offset with respect thereto.

Each container may have a bottom surface which, in turn, may be perpendicular to said longitudinal axis and designed to support the container in the erect position.

For the container, moreover, it is possible to identify first and second side surfaces, which are arranged opposite each other in the transverse direction, as well as a front end side or surface and a rear end side or surface, opposite to the front end side.

The front end surface is generally that which, at the outlet of the apparatus, must be directed forwards in the same sense as a sense of advancing movement during extraction, for example towards following handling machines which may be designed to apply a label to a predefined surface of the two side surfaces. It is clear to the person skilled in the art that the front side may also not have a surface, but be in the form of a line connecting the two opposite side surfaces.

For filling of the articles, in particular in the case of asymmetrical articles such as the container described above, the apparatus may be configured so that the first article pick and place devices 30 are intended to pick up only articles arranged on the respective transport plane 10a with one or more predefined first orientations, for example in order to pick up the containers which, arranged randomly, have a first side face visibly exposed on top.

Figure 5A:
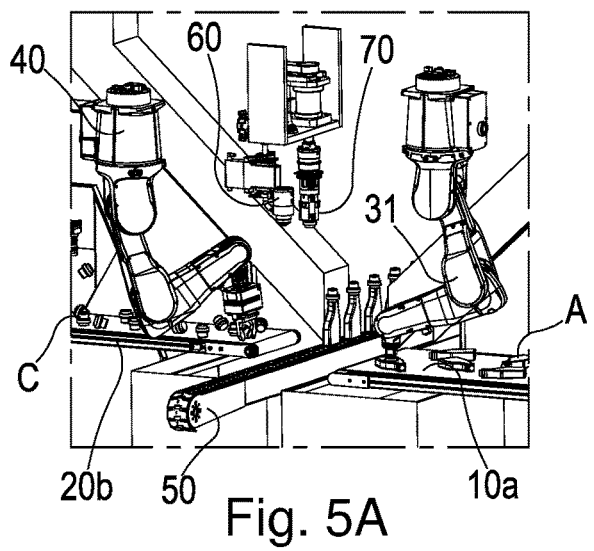
FIGS. 5A-5F: show perspective views of an example of a filling, capping and extraction cycle performed by the apparatus according to FIG. 1.
Figure 5B:
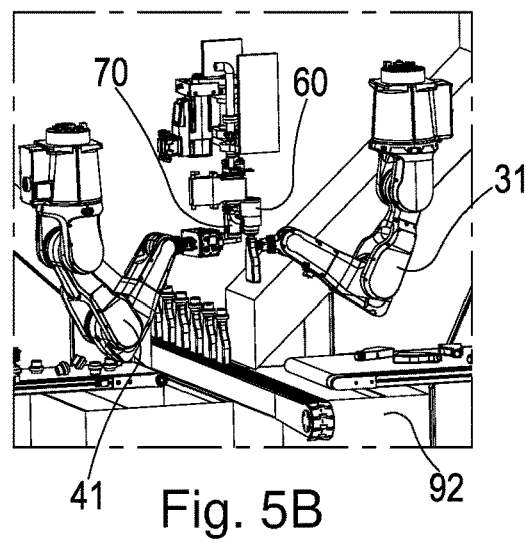
Figure 5C:
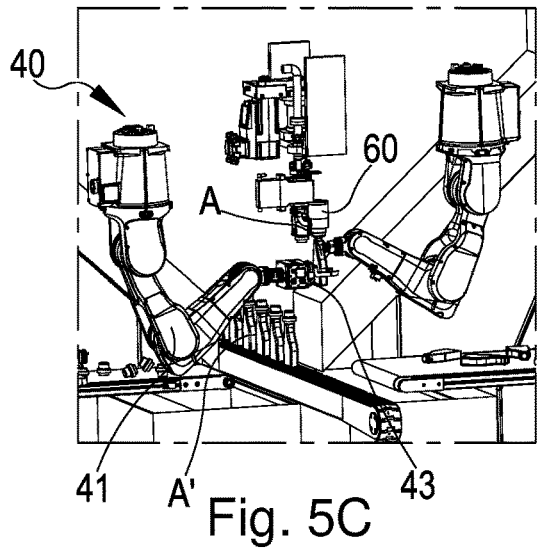
Figure 5D:
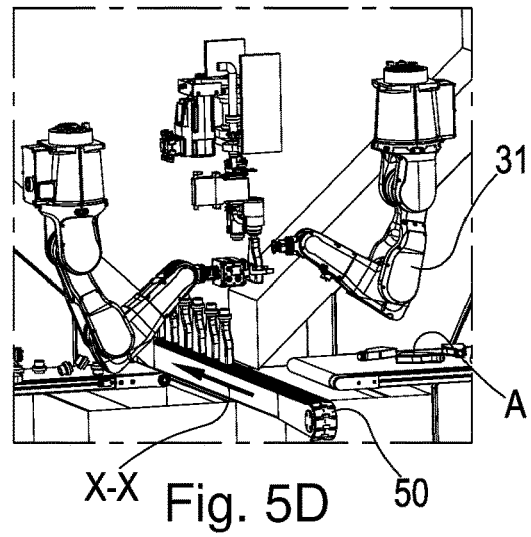
Figure 5E:
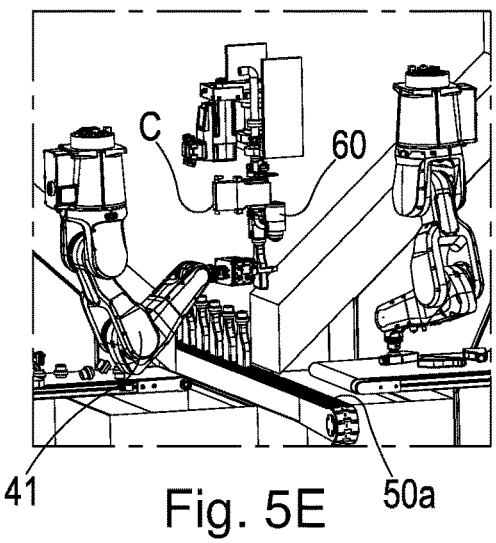

With this configuration and as shown in FIGS. 5A-F the operating principle of the modular filling and capping apparatus may be as follows:

the containers A picked up from the storage receptacle 92a are randomly fed to the transport plane 10a which transports them in the direction A1 within the viewing range of a camera of the detection system, which detects the position and orientation thereof on the plane itself—for example defined by the orientation of the front and rear end faces and/or by the position of its two side faces which are respectively hidden resting on the belt 10b and visible on top—transmitting the information to the processing and control unit 500;

the control unit 500, if necessary correlating this information with the information measuring the advancing movement of the belt, commands the operation of the first robotic arm 31 which is authorized to pick up, for example, only the containers which have a certain first orientation on the transport plane, while allowing instead the other containers to pass by;

the first robot 31 picks up (FIG. 5A) by means of its gripping means 32 a selected container A and manipulates it so as to bring it into the filling position in the filling station (FIG. 5B) with a predetermined orientation, for example with neck erect and a filling opening in a top position and the front end face correctly directed in the predefined sense for extraction downstream;

dispensing of the product inside the container A by the dispensing means 61 of the filling station 60 is started;

simultaneously, the closing elements C are randomly fed to the transport plane 20a, their position and orientation is detected by the detection system and the second pick and positioning device 40 is controlled (FIG. 5A) so as to pick up a selected closing element C and feed it (FIG. 5B) to the application means 71 of the closing station 70, which stably hold it;

once the closing element has been released to the closing station 70, the second pick and place devices 40 position (FIG. 5C) the associated gripping means 43, in particular the internal jaws 44b, so as to grip the container A arranged in the filling position for receiving the product in the filling station 60, freeing the robotic arms 31 of the first pick and positioning devices FIG. 5D) which may move to pick up (FIG. 5E) a new container A from the transport plane 10a. The aforementioned operations may take place even before filling is performed or during filling;

once filling has been completed, the pick and place device 40 moves the filled container A from the filling station to the closing position underneath the means 71 for application of the closing element C, inside the capping station (FIG. 5E);

the application means 71 apply, for example by means of screwing or pressure, the closing element C to the top mouth of the filled container A, held in the closing position by the gripping means 43 of the second robotic arm 41;

in the meantime, the first robotic arm 31 has picked up and redirected a new article A to be filled by positioning it (FIGS. 5E, 5F) in the filling position in the filling station;

once application of the closing element C has been completed, the second robotic arm 41 moves the filled and closed article A' from the closing station into an extraction position on the extraction plane 50a, releasing the said article by means of opening of the jaws 44b of the gripping means 43, for transportation in the longitudinal direction X-X by the extraction plane 50a;

the second robotic arm 41 is now free to pick up a new closing element and feed it to the closing station 70 for capping the next article A already fed to the filling position by the first robotic arm 31.

Figure 5F:
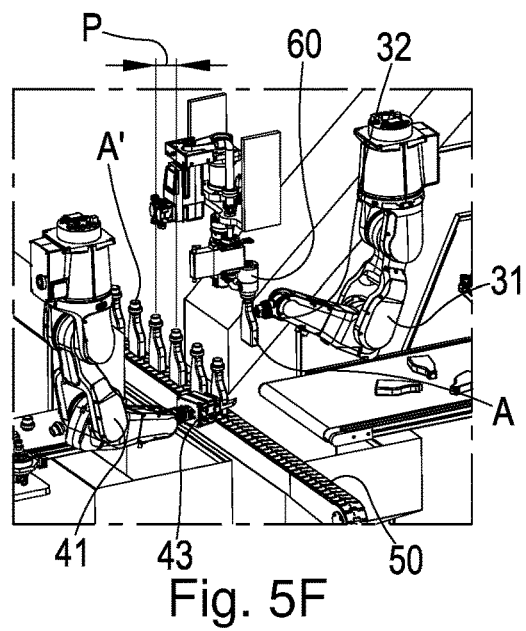

As shown in FIG. 5F, the containers A' being extracted on the extraction plane can be arranged in one position of a plurality of predefined extraction positions which are spaced from each other at a constant interval P.

Figure 6:
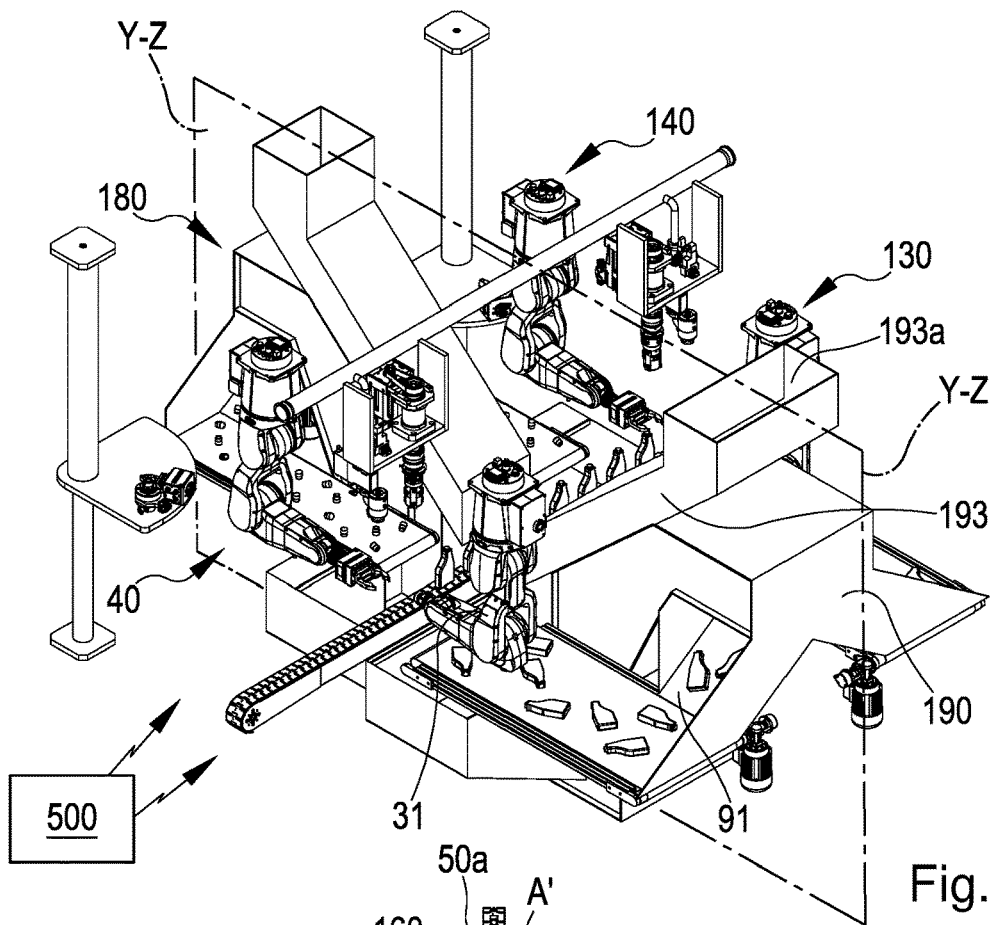
FIG. 6: shows a perspective view of a second example of embodiment of a modular apparatus for filling and capping articles according to the disclosure.
Figure 7:
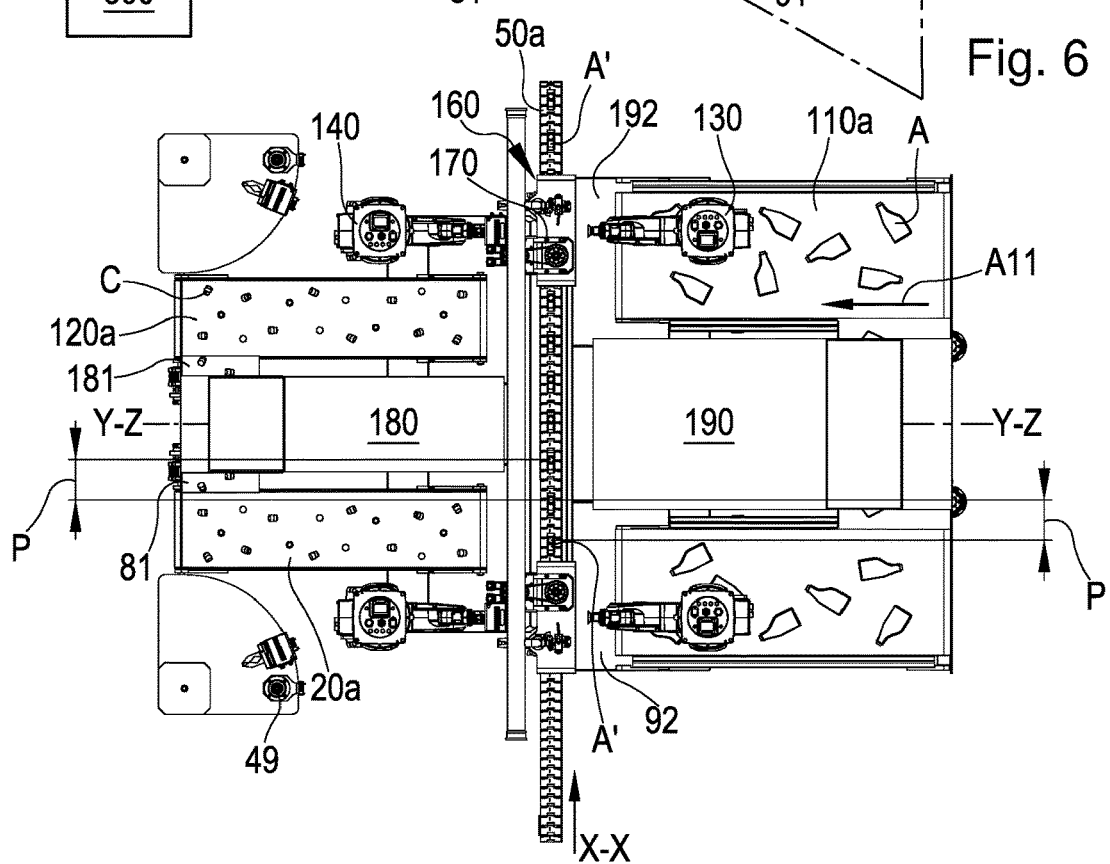
FIG. 7: shows a top plan view of the apparatus according to FIG. 6.

With reference to FIGS. 6 and 7, a second example of embodiment of a modular filling and capping apparatus according to the present disclosure comprises at least one further transport plane 110a for the articles A randomly fed in a respective further transport direction A11, associated with at least one further pick and place device 130 for the articles A.

A further plane 120a for transporting the closing elements C in a respective transport direction C11 is arranged on the opposite side of the extraction plane 50a with respect to the further transport plane 110a and is associated with a respective further second pick and place device 140.

As shown, in the example of FIGS. 6,7, the further transport planes 110a, 120a are arranged downstream in the longitudinal direction of the first transport planes 10a, 20a and the extraction plane 50a is prolonged in the longitudinal extraction direction X-X so as to receive the articles A' filled in a further filling station 160 and capped in a further closing station 170, the further stations 160, 170 being arranged downstream of the first filling and capping stations 80, 70 in the longitudinal extraction direction X-X.

As regards the arrangement of the further filling stations 160 and capping stations 170, with respect to the further transport planes 110a, 120a and/or the first and second further pick and place devices 130, 140 and/or with respect to the extraction plane, the same arrangements and configurations described in detail with reference to the embodiment of FIGS. 1,2,3 apply.

In some embodiments, the further transport planes 110a, 120a and/or the further filling and capping stations 160,170 are arranged symmetrically with respect to a vertical transverse plane y-z of the apparatus (FIG. 7). It is also possible to instead arrange the further filling station 160 upstream of the further capping station 170 in the longitudinal extraction direction X-X.

It is clear how with this embodiment it is possible to provide independent modules for filling and capping randomly fed articles inside a same modular apparatus according to the disclosure, further improving the versatility of the apparatus.

As shown in FIGS. 6, 7, the first transport plane 10a and the further transport plane 110a for the articles A may be fed by a same feeding system 190 arranged between the first transport plane and the further transport plane 110a in the longitudinal direction X-X. This feeding system may also comprise a feeding hopper 103 which by means of a duct 193 feeds a first article storage receptacle 92 and a further article storage receptacle 192 which, by means of a feeding system—for example a porter system—each feed the respective first chute 91 or further chute 191 for feeding the articles A to the respective first transport plane 10a or further transport plane 110a.

Similarly, a single system 180 for feeding the closing elements may be arranged between the first plane 20a and the further plane 120a for transporting the closing elements C in order to feed by means of the respective chutes 81, 181 the closing elements to the said planes.

Some aspects of the feeding system 180,190 described above, with reference to the embodiment of FIG. 1, are also applicable to the embodiment of FIGS. 6, 7 and are not repeated here.

As shown in FIG. 7, all the further systems 110, 120, 130, 140, 160, 170, 180, 190 are replicated in a mirror-image arrangement with respect to said transverse-vertical plane Y-Z of symmetry. This simplifies both the production and the configuration of the apparatus, for example in relation to the movements of the pick and place devices 30,40.

It will be clear to the person skilled in the art that other arrangements are possible, for example the further filling station 160 may be arranged, upstream in the longitudinal direction X-X, of the further closing station 170, or the further article and closing element transport planes 110a, 120a may be arranged on opposite sides of the extraction system with respect to the corresponding first transport planes 10a,20a.

According to one aspect, the processing and control unit 500 may be configured to control the first and second pick and place devices 30, 40 and the first filling station 60 and the first closing station 70 independently of the further first and second pick and place devices 130, 140 and the associated further filling and capping stations 60, 70. A further degree of versatility in the management of the production is therefore obtained since a same modular apparatus is able to provide different production types and/or volumes along a same extraction plane 50a.

As described above, the processing and control unit will coordinate the positioning on the extraction plane 50a of the articles A' output from the first closing station 70 or further closing station 170 so as to prevent interference and optimize the flow of filled and capped articles A' being extracted. In some embodiments, this will take place as described above by assigning for each article A' to be extracted a respective extraction position from among a plurality of extraction positions arranged at a constant interval P along the extraction direction X-X on the extraction plane.

By means of the processing unit 500, the spacing interval P of said predefined positions may be easily varied depending on the different production and configuration requirements of the plant, without structural alterations. This interval may also not be strictly constant, but comply for example with a certain periodic rule.

The free end of one or more of the pick and place devices 30,40, in particular of one or more of the robotic arms 41,141 of the second pick and place devices 40, 140, may be configured to perform an automated replacement of the gripping means 43 arranged at the free end with a different end tool. In particular (FIG. 1), the gripping means 43 may be replaced with gripping means 48 having a different format and/or size, suitable for different closing elements and/or articles A.

In addition or alternatively, the end means 43 may also be replaced with different end means which are not intended to grip the closing elements C and/or articles A, but are designed to perform a maintenance or format change-over operation on the modular apparatus.

In particular, these replacement end means may comprise a collector 49, for example in the form of a small cup, designed to be applied to the dispensing means of the filling station in order to collect a liquid for washing the product feeding and dispensing means of the filling station and convey it to a storage receptacle.

A support S40 may be arranged in a position accessible by one or more of the pick and place devices 40 and is designed to carry one or more of said replacement end means 48,49. For example, the support S40 may be in the form of a tray and/or arranged in an outer position in the transverse direction Y-Y with respect to the robotic arm 41, in particular adjacent to the distal end of the associated transport plane 20a on which the arm is configured to operate.

According to an example embodiment, the free end of one or more of the pick and place devices 30,40, in particular of one or more of the robotic arms 41,141 of the second pick and place devices 40,140, is configured with interface means for coupling/decoupling with/from the end means, allowing automated replacement of the said end means.

In particular, the interface means may be arranged so as to provide, once coupling has been performed, an electrical supply and/or a pneumatic supply to one of the end means and/or to cooperate with complementary coupling/decoupling means arranged on the tray S40, for example comprising a support, provided with interface means, which engages and retain the end means, facilitating coupling or decoupling thereof with/from the interface means of the robotic arm.

Therefore, an even more improved flexibility, versatility and degree of automation of the modular apparatus is obtained.

In addition to the aspects already evident from the above description, there are numerous other aspects resulting from the modular apparatus according to the disclosure:
 the possibility of adjusting the production speed or volume of a packaging plant, replicating N times modular filling and capping apparatus and/or modules, with aspects both for the user of the machine (possibility of varying the production by adding other modules at a later time) and for the machine manufacturer (less design work).
 flexibility when defining the overall layout of the line, since the modules may be arranged in different positions with respect to each other, making better use of the available space;

It is in fact clear to the person skilled in the art that the longitudinal extraction direction is not necessarily linear over the whole length of a packaging plant, it being possible for example to introduce bends in the extraction plane between one modular apparatus and the next one or between the modular filling and capping apparatus and following downstream operating machines;
 the possibility of filling the articles with different products or capping them with different closing elements, simultaneously on a same line of a plant and/or extracting them from a same flow of articles, and if necessary packaging them in batches (boxes) which contain mixed products;
 the possibility of reducing or increasing the production volume of a plant, keeping inactive or activating one or more of the filling and capping modules or stations which may be independently controlled.

Figure 8:
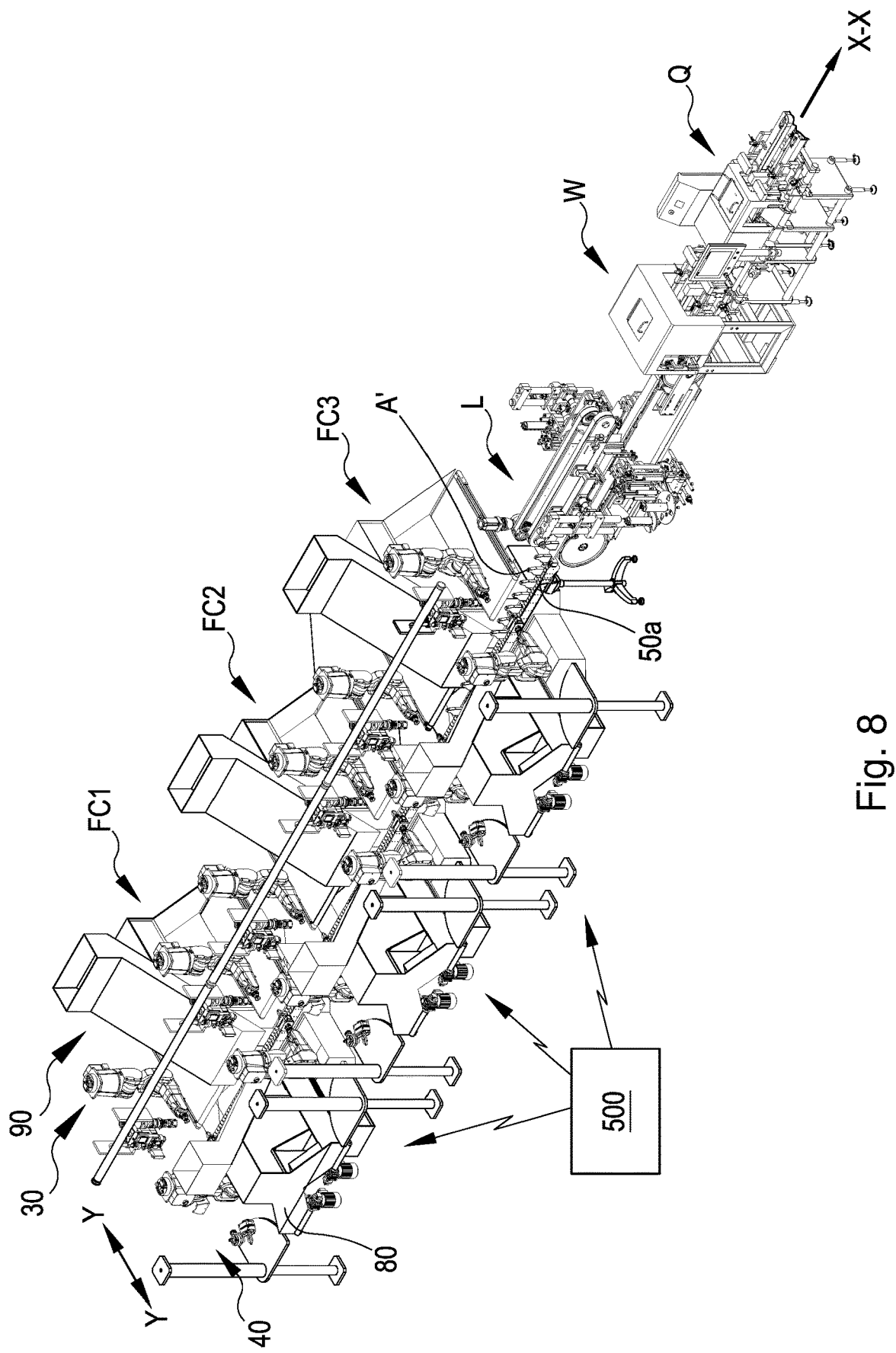
FIG. 8: shows an example of embodiment of a plant for packaging products inside randomly fed articles A, comprising a plurality of modular apparatus according to the present disclosure.

The present disclosure relates furthermore to a plant for packaging products in randomly fed articles A, comprising one or more modular apparatus according to the present disclosure, arranged in series along the extraction direction X-X and configured to arrange the filled and closed articles A' on a same extraction plane, an example of embodiment of which is shown in FIG. 8, and comprises three filling and closing apparatus FC1, FC2, FC3 realized according to the embodiment shown in FIGS. 6 and 7 and arranged in series along the extraction plane 50a in the longitudinal direction X-X.

The plant may comprise further downstream operating machines such as a labelling machine L and/or weighing machine W and/or an apparatus Q for checking the articles A' and/or a packaging machine.

In some embodiments, one or more or all said downstream operating machines are arranged in series along the extraction direction X-X in order to receive the articles A' extracted in sequence from the extraction plane 50*a*, as shown by way of example in FIG. 8.

Two or more of said modular apparatus of the plant may be configured to manage production varying in terms of volume, dispensed product, article A, or processed closing element and/or production times and modes.

In a packaging plant according to the disclosure it is therefore also possible to separate structurally the various functions of the plant, allowing the user to add in a simple manner functions which were initially not provided, without radically altering or completely replacing the production line.

Although described in connection with a number of embodiments and a number of examples of implementation of the disclosure, it is understood that the scope of protection of the present patent is defined solely by the claims below.

The invention claimed is:

1. A modular apparatus for filling and closing randomly fed articles, comprising:
    an article transport system for transporting the articles arranged randomly on at least one first article transport plane along a respective article transport direction for transporting articles;
    a closing element transport system for transporting closing elements, in particular caps, arranged randomly on at least one first closure transport plane for transporting closing elements, in a respective closure transport direction;
    a filling station, configured to supply and dispense a product inside one of said articles arranged in a filling position;
    a closing station for closing the filled articles, provided with application means for applying a respective one of said closing elements onto a respective one of said filled articles;
    an extraction system for transporting the filled and closed articles along a longitudinal extraction direction from an upstream position to a downstream position;
    one or more first pick and place devices arranged and configured to pick up the articles arranged randomly on the at least one first article transport plane for transporting articles and to position them in a predefined orientation and/or position at the filling station;
    one or more second pick and place devices, arranged and configured to pick up one of said closing elements from said at least one first closure transport plane of the respective transport system and to feed the one closing element to the application means of the closing station;
    a detection system for detecting the position and/or the arrangement of the articles in transit on the at least one first article transport plane and of the closing elements in transit on the at least one first closure transport plane and making the information available for controlling the pick and place devices;
    a processing and controlling unit, designed to receive information about the position and/or arrangement of the articles and/or of the closing elements and to control the pick and place devices;
    wherein said at least one first article transport plane for transporting the articles and said at least one first closure transport plane for transporting the closing elements are arranged on opposite sides of the extraction system.

2. The modular apparatus according to claim 1, further comprising one or more of:
    an article feeding assembly for randomly feeding empty articles from a storage receptacle to the at least one first article transport plane, upstream of detection means of the detection system in the article transport direction; wherein the storage receptacle is arranged in a position situated below, in the vertical direction, the first article transport plane for transporting the articles and such that articles not picked up by the one or more first pick and place devices fall into the storage receptacle at the end of their travel on the at least one first article transport plane; and
    a closing element feeding assembly for randomly feeding closing elements from a second storage receptacle to the at least one first closure transport plane, upstream of detection means of the detection system in the closure transport direction; wherein the second storage receptacle is arranged in a position situated below, in the vertical direction, the first closure transport plane for transporting the closing elements and such that closing elements not picked up by the one or more second pick and place devices fall into the second storage receptacle at the end of their travel on the first transport plane.

3. The modular apparatus according to claim 1, wherein one or more of the first pick and place devices and the second pick and place devices comprise at least one robotic arm, a free end of which carries end means, the at least one robotic arm being anthropomorphic, with at least five or at least six axes of rotation and/or degrees of freedom.

4. The modular apparatus according to claim 3, wherein the end means of one or more of the first or second pick and place devices comprise a gripper formed by two claws situated opposite each other and movable towards and away from each other in order to open and close the gripper, wherein each claw defines a first jaw configured to form with the opposite first jaw a means for gripping a closing element, and a second jaw configured to form, with the opposite second jaw, a means for gripping an article; opening and closing of the gripper being adjustable to different positions.

5. The modular apparatus according to claim 3, wherein one or more of the first or second pick and place devices is configured to perform automated replacement of the end means, arranged at the free end of the robotic arm, with different end means having at least one of a different format and a different size, or with replacement end means comprising a collector designed to be applied to the dispensing means of the filling station in order to collect a washing liquid.

6. The modular apparatus according to claim 1, wherein one or more first pick and place devices and one or more second pick and place devices are respectively arranged each at the at least one first article transport plane for transporting articles or at least one first closure transport plane for transporting the closing elements, on which a respective area of action of one of the pick and place devices is defined.

7. The modular apparatus according to claim 1, further comprising gripping and positioning means configured and controlled to perform one or more of the following operations:
    holding the picked-up and positioned article in the filling position in the filling station;
    displacing the article filled by the filling station into a closing position in the closing station;
    holding the article in the closing position during application of a closing element of the closing elements;

displacing a filled and closed article from the closing position in the closing station into a given position and orientation for extraction on the extraction plane.

8. The modular apparatus of claim 7, wherein said gripping and positioning means are carried by one of the second pick and place devices.

9. The modular apparatus according to claim 1, wherein the closing station comprises holding and application means for holding and applying a closing element onto a filled article arranged in a closing position and wherein:
   the at least one first article transport plane and the at least one first closure transport plane for transporting respectively the articles to be filled and the closing elements are arranged on opposite sides, in the transverse direction of the holding and application means and of the closing position; and/or
   the holding and application means and the closing position are located above, in the vertical direction, the extraction plane and/or are intersected by a longitudinal-vertical plane passing orthogonally through the extraction plane.

10. The modular apparatus according to claim 1, wherein the filling and closing stations are arranged adjacent and/or substantially aligned in the longitudinal direction of extraction.

11. The modular apparatus according to claim 1, wherein the detection system comprises at least a first and a second image acquisition device, each arranged so as to at least partially capture a respective first article transport plane for transporting the articles or first closure transport plane for transporting the closing elements, upstream in the direction of advancing movement of an action zone on the respective plane of the respective first or second pick and place devices.

12. A plant for packaging articles to be filled with a product and closed with a closing element, comprising at least two modular apparatus according to claim 1, arranged in series along the longitudinal direction of extraction and configured to extract the respective filled and closed articles with a same extraction system.

13. The modular apparatus according to claim 1, wherein the extraction system comprises an extraction plane for extracting the filled and closed articles which is oriented parallel to the longitudinal extraction direction and to a transverse widthwise direction of the modular apparatus,
   wherein the filled and closed articles are transported on the extraction plane, arranged with a predefined orientation and/or position, and
   wherein said first article transport plane for transporting the articles and said first closure transport plane for transporting the closing elements are arranged on opposite sides of the extraction plane for extraction of the filled and closed articles.

14. The modular apparatus according to claim 13, wherein the first article transport plane for transporting the articles and the first closure transport plane for transporting the closing elements are arranged on opposite sides in the transverse direction of a longitudinal-vertical plane parallel to the longitudinal direction of extraction and to a vertical heightwise direction and passing orthogonally through the extraction plane of the extraction system.

15. The modular apparatus according to claim 13, wherein the first article transport plane and the article transport direction of advancing movement of the articles on the first article transport plane are oriented at an angle, between 80 and 100 degrees, with respect to the longitudinal extraction direction and directed towards the extraction plane of the extraction system; and/or
   wherein the first closure transport plane and the closure transport direction of advancing movement of the closing elements on the first transport plane are oriented at an angle between 80 and 100 degrees with respect to the longitudinal direction of extraction and directed towards the extraction plane of the said extraction system.

16. The modular apparatus according to claim 13, wherein one or more first pick and place devices and one or more second pick and place devices are arranged on opposite sides in the transverse direction of a longitudinal-vertical plane parallel to the longitudinal direction of extraction and to the vertical heightwise direction and passing orthogonally through the extraction plane of the extraction system.

17. The modular apparatus according to claim 13, wherein the filling station comprises dispensing means for dispensing the product inside the article arranged in the filling position and wherein:
   the first article transport plane and the first closure transport plane for transporting respectively the articles to be filled and the closing elements are arranged on opposite sides in the transverse direction of the dispensing means of the filling station; and/or
   the dispensing means and the filling position are located above, in the vertical direction, the extraction plane and/or are intersected by a longitudinal-vertical plane passing orthogonally across the extraction plane.

18. The modular apparatus according to claim 13, comprising:
   a further article transport plane for transporting the articles fed randomly in a respective further direction of transport, associated with at least one further first pick and place device for the articles;
   a further closure transport plane for transporting the closing elements in a respective direction of transport, associated with a respective further second pick and place device and arranged on the opposite side of the extraction plane, with respect to the further article transport plane for transporting the articles;
   a further filling station and a further closing station which are arranged so as to fill and close, respectively, articles picked up from said further article transport plane;
   wherein the extraction plane of the extraction system is extended in the longitudinal direction of extraction to receive the articles filled in the further filling station and closed in the further closing station.

19. The modular apparatus of claim 18, wherein the further article and closure transport planes and/or the further filling and closing stations are arranged symmetrically relative to a vertical transverse plane of the apparatus with respect to the respective first article or closure transport planes and/or the respective first filling or closing station.

20. The modular apparatus according to claim 19, wherein the first article transport plane and the further article plane are arranged on the same side with respect to the extraction system and in that the first closure transport plane and the further closure transport plane for transporting the closing elements are arranged on the same side with respect to the extraction system.

21. The modular apparatus according to claim 20, wherein the first article transport plane and the further article transport plane for transporting the articles are fed by a same article feeding assembly arranged between the first article transport plane and the further article transport plane in the longitudinal; and/or wherein:
   the first closure transport plane and the further closure transport plane for transporting the closing elements are fed by a same feeding assembly, arranged between the first and the further plane in the longitudinal direction.

22. A method for filling and closing randomly fed articles, by means of randomly fed closing elements, comprising the steps of:
  feeding articles to an article transport system of a modular filling and closing apparatus, with transportation of the articles arranged randomly on a first article transport plane in a respective at least first article transport direction;
  detecting at least one of a position and an arrangement of the articles in transit on the first article transport plane and emitting corresponding position and arrangement information;
  picking up one of the articles arranged randomly on the transport system and positioning it with a predefined orientation and/or in a predefined filling position in a filling station, by means of a first pick and place device controlled based on the emitted position and arrangement information of the articles;
  feeding closing elements to a closure transport system, with transportation of the closing elements arranged randomly on a first closure transport plane in a respective at least first closure transport direction;
  detecting at least one of a position and an arrangement of the closing elements in transit on the closure transport plane and emitting corresponding position and/or arrangement information;
  picking up, by means of a second pick and place device controlled based on the emitted position and arrangement information of the closing elements, one of the closing elements arranged randomly on the first closure transport plane and feeding the same to application means of a closing station for closing the filled articles, with holding of the closing element by the application means;
  filling said article arranged in a filling position by dispensing a product inside said article;
  applying the closing element onto the filled article arranged in a closing position in the closing station by means of the application means of the closing station;
  transporting the filled and closed article arranged with a predefined orientation and/or position by means of an extraction system, along a longitudinal direction of extraction from upstream to downstream;
  wherein the first article transport plane for transporting the articles and the first closure transport plane for transporting the closing elements, are arranged on opposite sides of the extraction system.

23. The method for filling and closing articles according to claim 22, wherein the first article transport plane for transporting the articles and the first closure transport plane for transporting the closing elements are arranged on opposite sides in the transverse direction of a longitudinal-vertical plane parallel to the longitudinal direction of extraction and to a vertical heightwise direction and passing orthogonally through the extraction plane of the extraction system; and/or wherein the direction of advancing movement of the articles on the first article transport plane is oriented at an angle, with respect to the longitudinal direction of extraction, and directed towards the plane of the extraction system; and/or wherein
  the direction of advancing movement of the closing elements on the first closure element transport plane is oriented at an angle, with respect to the longitudinal direction of extraction and directed towards the extraction plane of the extraction system.

24. The method for filling and closing articles according to claim 23, further comprising one or more of the following steps:
  holding, by means of gripping and positioning means, an article of the randomly fed articles in a filling position in the filling station;
  displacing, by means of gripping and positioning means, the article filled by the filling station into the closing position for closing in a closing station;
  holding, by means of gripping and positioning means, the article in the closing position during application of a closing element;
  displacing, by means of gripping and positioning means, the filled and closed article from the closing position in the closing station into a given position and/or orientation for extraction on the extraction plane;
  wherein said gripping and positioning means are carried by one or more of the second pick and place devices.

25. The method according to claim 24, wherein the predefined transport position for extraction of one or more filled and closed articles is a position selected from among a plurality of predefined positions, which are spaced from each other at a constant interval along the extraction direction.

26. The method of claim 22, wherein the filled and closed article arranged with a predefined orientation and/or position are transported on an extraction plane of the extraction system which is oriented parallel to the longitudinal direction of extraction of the articles and to a transverse widthwise direction of the modular filling and closing apparatus;
  and wherein the first article transport plane for transporting the articles and the first transport plane for transporting the closing elements are arranged on opposite sides of the of the extraction plane.

* * * * *